United States Patent
Ding

(10) Patent No.: US 11,290,273 B2
(45) Date of Patent: Mar. 29, 2022

(54) MULTIVARIATE DIGITAL SIGNATURE SCHEMES BASED ON HFEV- AND NEW APPLICATIONS OF MULTIVARIATE DIGITAL SIGNATURE SCHEMES FOR WHITE-BOX ENCRYPTION

(71) Applicant: Jintai Ding, Cincinnati, OH (US)

(72) Inventor: Jintai Ding, Cincinnati, OH (US)

( * ) Notice: Subject to any disclaimer, the term of this patent is extended or adjusted under 35 U.S.C. 154(b) by 40 days.

(21) Appl. No.: 15/562,034

(22) PCT Filed: Mar. 25, 2016

(86) PCT No.: PCT/CN2016/077293
§ 371 (c)(1),
(2) Date: Sep. 27, 2017

(87) PCT Pub. No.: WO2016/155565
PCT Pub. Date: Oct. 6, 2016

(65) Prior Publication Data
US 2018/0091302 A1    Mar. 29, 2018

Related U.S. Application Data

(60) Provisional application No. 62/139,935, filed on Mar. 30, 2015.

(51) Int. Cl.
*H04L 9/30*    (2006.01)
*H04L 9/32*    (2006.01)

(52) U.S. Cl.
CPC .......... *H04L 9/3093* (2013.01); *H04L 9/3026* (2013.01); *H04L 9/3247* (2013.01)

(58) Field of Classification Search
CPC ... H04L 9/3039; H04L 9/3026; H04L 9/3247; H04L 9/3093
See application file for complete search history.

(56) References Cited

U.S. PATENT DOCUMENTS

| | | | |
|---|---|---|---|
| 5,231,668 A | 7/1993 | Kravitz | |
| 5,790,675 A | 8/1998 | Patarin | |
| 2014/0380062 A1* | 12/2014 | Sakumoto | H04L 9/3247 713/189 |

FOREIGN PATENT DOCUMENTS

| | | | |
|---|---|---|---|
| CN | 102006168 | * | 11/2010 |
| CN | 102006168 A | | 4/2011 |

OTHER PUBLICATIONS

Patarin et al., "Asymmetric Cryptograhpy with S-Boxes—Is it easier than expected to design efficient asymmetric cryptosystems?" LNCS, vol. 1334, pp. 369-380 https://rd.springer.com/chapter/10.1007/BFb0028492 (Year: 1997).*

(Continued)

*Primary Examiner* — Theodore C Parsons
(74) *Attorney, Agent, or Firm* — BakerHostetler

(57) ABSTRACT

We present new designs to choose the parameter sets for more efficient HFEv-based signature schemes. The key method is to reduce the degree of the central HFEv-polynomial while, at the same time, increasing the number of Vinegar variables and Minus equations. The new design speeds up the signature generation process by two orders of magnitude (hundreds of times) compared to QUARTZ. We present also new methods to use multivariate signature schemes to build a white box encryption scheme. This technique is applicable to all existing multivariate signature designs including the HFEV-design and the improvements.

15 Claims, 2 Drawing Sheets

General workflow of BigField schemes

(56) References Cited

OTHER PUBLICATIONS

Biryukov et al., "Cryptographic Schemes Based on the ASASA Struction: Black-box, White-box, and Public-key," Advances in Cryptology—ASIACRPYT 2014, p. 63-84, (provided by applicant in IDS) (Year: 2014).*

Ding et al., "Rainbow, a New Multivariable Polynomial Signature Scheme," ACNS 2005, 164-175, (provided by applicant in IDS) (Year: 2005).*

Patarin et al., QUARTZ, 128-Bit Long Digital Signatures, Topics in Cryptology-CT-RSA 2001, LNCS, vol. 2020, 282-297, (provided by applicant in IDS) (Year: 2001).*

Ding et al., "Degree of Regularity for HFEv and HFEv-", Post-Quantum Cryptography-PQCrypto 2013, LNCS 7932, 52-66, (provided by the applicant via IDS) (Year: 2013).*

Ding et al., "Multivariate Public Key Cryptography", LNCS, vol. 7932, 193-241, https://rd.springer.com/chapter/10.1007/978-3-642-38616-9_4 (Year: 2 013).*

Bernstein et al. (eds.): "Post Quantum Cryptography", Springer, 2009.

Biyukov et al., "Cryptographic Schemes Based on the ASASA Structure: Black-Box, White-Box, and Public-Key (Extended Abstract)", Advances in Cryptology—ASIACRYPT 2014, 1, 63-84.

Bogdanov et al., "Time-Area Optimized Public-Key Engines: MQ-Cryptosystems as Replacement for Elliptic Curves?", Crytographic Hardware and Embedded Systems—CHES 2008, vol. 5154, 45-61.

Chen et al., "SSE Implementation of Multivariate PKCs on Modern x86 CPUs", Crytographic Hardware and Embeded Systems—CHES 2009, vol. 5747, 33-49.

Chow et al., "A White-Box DES Implementation for DRM applications", Digital Rights Management Workshop, 2002, LNCS, vol. 2696, 1-15.

Chow et al., "White-Box Cryptography and an AES Implementation", SAC 2002, LNCS 2595, 250-270.

Ding et al., "Rainbow, a New Multivariate Polynomial Signature Scheme" ACNS 2005, LNCS 3531, 164-175.

Ding et al., "Inverting HFE Systems Is Quasi-Polynomial for All Fields", Advances in Cryptology—CRYPTO 2011, LNCS 6841, 724-742.

Ding et al., "Degree of Regularity for HFEv and HFEv-", Post-Quantum Cryptography—PQCrypto 2013, LNCS 7932, 52-66.

Ding et al., "The Cubic Simple Matrix Encryption Scheme", Post-Quantum Cryptography—PQCrypto 2014, LNCS 8772, 76-87.

Faugére, "A new efficient algorithm for computer Gröbner bases $(F_4)$", Journal of Pure and Applied Algebra, 1999, 139(1-3), 61-88.

Faugére et al., "Algebraic Cryptanalysis of Hidden Field Equation (HFE) Cryptosystems Using Gröbner Bases", Advances in Cryptology—CRYPTO 2003, LNCS, vol. 2729, 44-60.

Kipnis et al., "Unbalanced Oil and Vinegar Schemes", Advances in Cryptology—EUROCRYPT 1999, LNCS, vol. 1592, 206-222.

Kipnis et al., "Cryptanalysis of the HFE Public Key Cryptosystem", Advances in Cryptology—CRYPTO 1999, LNCS, vol. 1666, 19-30.

Matsumoto et al., "Public quadratic polynomial-tuples for efficient signature-verification and message-encryption", Advances in Cryptology—EUROCRYPT 1988, LNCS, vol. 330, 419-453.

Mohamed et al., "Towards Algebraic Cryptanalysis of HFE Challenge 2", International Journal of Multimedia and Ubiquitous Engineering, 2011, 6(4), 67-76.

Patarin, "Cryptanalysis of the Matsumoto and Imai Public Key Scheme of Eurocrypt '88" Advances in Cryptology—CRYPTO 1995, LNCS, vol. 963, 248-261.

Patarin et al., "QUARTZ, 128-Bit Long Digital Signatures", Topics in Cryptology—CT-RSA 2001, LNCS, vol. 2020, 282-297.

Patarin et al., "Flash, a fast multivariate signature algorithm", Topics in Cryptology—CT-RSA 2001, LNCS, vol. 2020, 298-307.

Richards, "Algorithms for Factoring Square-Free Polynomials over Finite Fields", Master Thesis, Simon Fraser University, Canada, Aug. 7, 2009, 30 pages.

Rivest et al., "A Method for Obtaining Digital Signatures and Public-Key Cryptosystems", Communications of the ACM, 1978,21(2), 120-126.

Shor, "Polynomial-Time Algorithms for Prime Factorization and Discrete Logarithms on a Quantum Computer", SIAM Rev., 1996, 41(2), 303-332.

Tao et al., "Simple Matrix Scheme for Encryption", Post-Quantum Cytrography—PQCrypto 2013, LNCS 7932, 231-242.

* cited by examiner

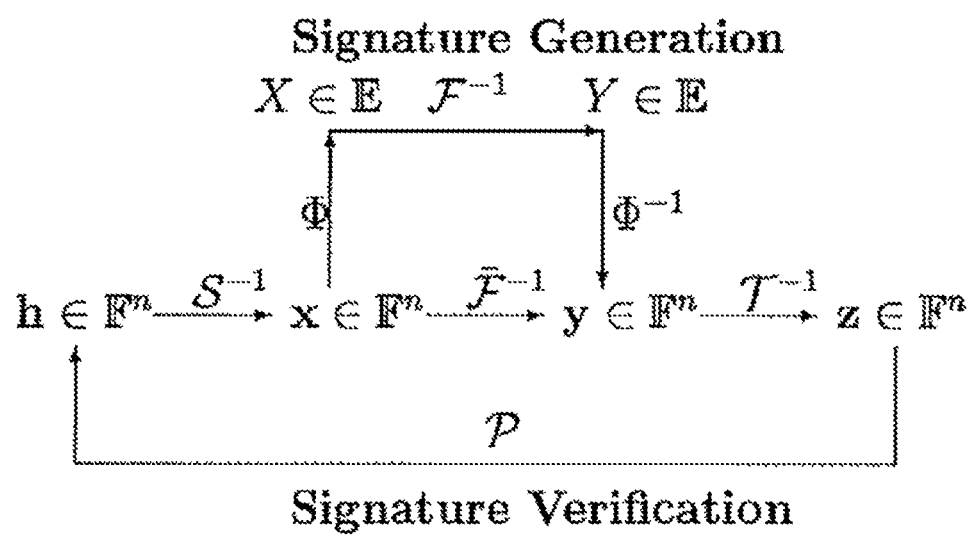
FIGURE 1. General workflow of BigField schemes

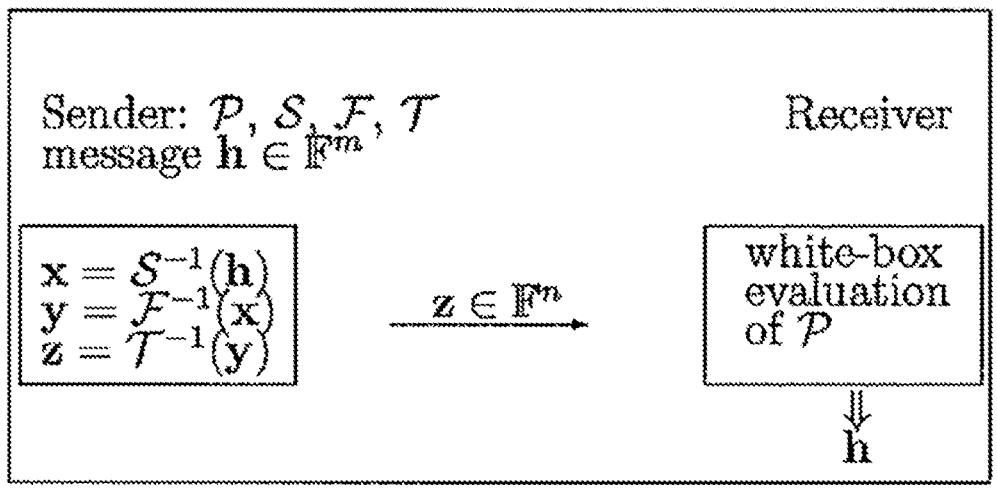
FIGURE 2. White-box implementation of a multivariate signature scheme

MULTIVARIATE DIGITAL SIGNATURE SCHEMES BASED ON HFEV- AND NEW APPLICATIONS OF MULTIVARIATE DIGITAL SIGNATURE SCHEMES FOR WHITE-BOX ENCRYPTION

CROSS-REFERENCE TO RELATED APPLICATIONS

This application is the National Stage of International Patent Application No. PCT/CN2016/077293 filed Mar. 25, 2016, which claims priority from U.S. Provisional Patent Application No. 62/139,935 filed Mar. 30, 2015, the disclosures of each of which are incorporated herein by reference in their entirety.

BACKGROUND

This invention is related to the construction of more efficient multivariate public key signature schemes using the HFEv-idea and new applications of multivariate digital signature schemes for white-box encryption.

Cryptographic techniques are an essential tool to guarantee the security of communication in modern society. Today, the security of nearly all of the cryptographic schemes used in practice is based on number theoretic problems such as factoring large integers and solving discrete logarithms. The best known schemes in this area are RSA [27], DSA [19] and ROC. However, schemes like these will become insecure as soon as huge enough quantum computers arrive. The reason for this is Shor's algorithm [28], which solves number theoretic problems like integer factorization and discrete logarithms in polynomial time on a quantum computer. Therefore, one needs alternatives to those classical public key schemes, based on hard mathematical problems not affected by quantum computer attacks.

Besides lattice, code and hash based cryptosystems, multivariate cryptography is one of the main candidates for this [1]. Multivariate schemes are in general very fast and require only modest computational resources, which makes them attractive for the use on low cost devices like smart cards and RPM chips [3, 4]. Additionally, at least in the area of digital signatures, there exists a large number of practical multivariate schemes [12, 17].

In 2001, Patarin and Courtois proposed a multivariate signature scheme called QUARTZ [24], which is based on the concept of HFEv-. While QUARTZ produces very short signatures (128 bit), the signature generation process is very slow (at the time about 11 seconds per signature [4]). The main reason for this is the use of a high degree HFE polynomial (for QUARTZ this degree is given by D=129), which makes the inversion of the central map very costly.

At the time of the design of the QUARTZ scheme, very little was known about the complexity of algebraic attacks against the HFE family of systems, in particular, the HFEv-schemes. Therefore, the authors of QUARTZ could not base their parameter choice on theoretical foundations.

Recently, there has been a fundamental breakthrough in terms of understanding the behavior of algebraic attacks on the HFE family of systems [9, 10, 13], which enables us to substantially improve the original design of QUARTZ without weakening the security of the scheme.

BRIEF SUMMARY OF THE INVENTION

First, we present new principles for the parameter choice of HFEv-based signature schemes, which allow us to improve the efficiency of the scheme drastically. Using the formula we have, we give examples at the low (80-bit) and high (112+-bit) security levels. The key method of this is to reduce the degree of the central HFEv-polynomial while, at the same time, increasing the number of Vinegar variables and Minus equations.

Under state-of-the-art theoretical and experimental analysis, we show that these modifications do not weaken the security of the scheme, compared to conservative choices like the original QUARTZ design. The new design (named Gui) speeds up the signature generation process by two orders of magnitude (hundreds of times) compared to QUARTZ, and has a comparable performance to standard signature schemes like RSA and ECDSA.

We present also new methods to use multivariate signature schemes to build a white box encryption scheme. This technique is applicable to all existing multivariate signature schemes including the HFEV-design [24] and the improvements above.

BRIEF DESCRIPTION OF THE DRAWINGS

FIG. 1 illustrates an example of a general workflow of BigField schemes.

FIG. 2 illustrates an example of a white-box implementation of a multivariate signature scheme.

DETAILED DESCRIPTION OF THE INVENTION 1.1 the Improvements on the Signature Schemes of the HFEv-Type The basic objects of multivariate cryptography are systems of multivariate quadratic polynomials, The security of multivariate schemes is based on the MQ Problem: Given m multivariate quadratic polynomials $p^{(1)}(x), \ldots, p^{(m)}(x)$ inn variables, find a vector $\bar{x}=(\bar{x}_1, \ldots, \bar{x}_n)$ such that $p^{(1)}(\bar{x})= \ldots =p^{(m)}(\bar{x})=0$.

The MQ problem (for m≈n) is proven to be NP-hard even for quadratic polynomials over the field GF(2) [16].

To build a public key cryptosystem based on the MQ problem, one starts with an easily invertible quadratic map $\mathcal{F}: \mathbb{F}^n \to \mathbb{F}^m$ (central map). To hide the structure of $\mathcal{F}$ in the public key, one composes it with two invertible affine (or linear) maps $\mathcal{S}\,\mathcal{S}: \mathbb{F}^m \to \mathbb{F}^m$ and $\mathcal{T}\,\mathcal{T}: \mathbb{F}^n \to \mathbb{F}^n$. The public key is therefore given by $\mathcal{P}\,\mathcal{P}=\mathcal{S} \circ \mathcal{F} \circ \mathcal{T}$. The private key consists of $\mathcal{S}$, $\mathcal{F}$ and $\mathcal{T}$ and therefore allows to invert the public key.

This invention is related to multivariate signature schemes of the BigField family. For this type of multivariate schemes, the map $\mathcal{F}$ is a specially chosen easily invertible map over a degree n extension field $\mathbb{E}\,\mathbb{E}$ of $\mathbb{F}$. One uses an isomorphism $\Phi: \mathbb{F}^n \to \mathbb{E}$ to transform $\mathcal{F}$ into a quadratic map $$\mathcal{F}\,\mathcal{F} = \Phi^{-1} \circ \bar{\mathcal{F}} \circ \Phi \qquad (1)$$

from $\mathbb{F}^n$ to itself. The public key of the scheme is therefore given by $$\mathcal{P} = \mathcal{S}\,\Omega\,\mathcal{F} \circ \mathcal{T} = \mathcal{S} \circ \Phi^{-1} \circ \bar{\mathcal{F}} \circ \Phi \circ \mathcal{T}: \mathbb{F}^n \to \mathbb{F}^n. \qquad (2)$$

The standard signature generation and verification process of a multivariate BigField scheme works as shown in FIG. 1.

Signature generation: To sign a message $h \in \mathbb{F}^n$, one computes recursively $x=\mathcal{S}^{-1}(h) \in \mathbb{F}^n$, $X=\Phi(x) \in \mathbb{E}$, $Y=\bar{\mathcal{F}}^{-1}(X) \in \mathbb{E}$, $y=\Phi^{-1}(Y) \in \mathbb{F}^n$ and $z=\mathcal{T}^{-1}(y)$. The signature of the message h is $z \in \mathbb{F}^n$.

Verification: To check the authenticity of a signature $z \in \mathbb{F}^n$, one simply computes $h' = \mathcal{P}(z) \in \mathbb{F}^n$. If $h'=h$ holds, the signature is accepted, otherwise rejected.

A widely known example for a multivariate scheme of the BigField family is the HFE (Hidden Field Equations) cryptosystem. For this scheme, the central map $\mathcal{F}$ has the form $$\mathcal{F}(X) = \sum_{\substack{i,j=0 \\ q^i+q^j \le D}} \alpha_{i,j} \cdot X^{q^i+q^j} + \sum_{\substack{i=1 \\ q^i \le D}} \beta_i \cdot X^{q^i} + \gamma \quad (3)$$

with coefficients $\alpha_{i,j}$, $\beta_i$ and $\gamma \in \mathbb{E}$. Doe to the special structure of $\mathcal{F}$, the map $\overline{\mathcal{F}}: \Phi^{-1} \circ \mathcal{F} \circ \Phi$ is a multivariate quadratic map over the vector space $\mathbb{F}^n$. Furthermore, if D is not too large, $\mathcal{F}$ can be efficiently inverted using Berlekamp's algorithm.

This basic idea was patented under U.S. Pat. No. 5,730,675 by Jacques Patarin with the title "Cryptographic communication process".

Two widely used variations of multivariate BigField schemes are the Minus variation and the use of additional (Vinegar) variables, Minus-Variation: The idea of this variation is to remove a small number of equations from the public key. The Minus-Variation was first used in schemes like SPLASH [25] to prevent Patarins Linearization Equations attack 1231 against the Matsumoto-Imai cryptosystem [20].

Vinegar-Variation: The idea of this variation is to parametrize the central map $\mathcal{F}$ by adding (a, small set of) additional (Vinegar) variables. In the context of multivariate BigField schemes, the Vinegar variation can be used to increase the security of the scheme against direct and rank attacks.

HFEv- is an HFE variant optimized for signatures, which combines the basic BEE scheme with the Minus and the Vinegar-Modification.

Let $\mathbb{F} = \mathbb{F}_q$ be a finite field with q elements and $\mathbb{E}$ be a degree n extension field of $\mathbb{F}$. Furthermore, we choose integers $D_i$ and v. Let $\Phi$ be the canonical isomorphism between $\mathbb{F}^n$ and $\mathbb{E}$, i.e.

$$\Phi(x_1, \ldots, x_n) = \sum_{i=1}^{n} x_i \cdot X^{i-1}. \quad (4)$$

The central map $\mathcal{F}$ of the HFEv-scheme is a map from $\mathbb{E} \times \mathbb{F}^v$ to $\mathbb{E}$ of the form $$\mathcal{F}(X) = \sum_{\substack{i,j=0 \\ q^i+q^j \le D}} \alpha_{i,j} \cdot X^{q^i+q^j} + \sum_{\substack{i=1 \\ q^i \le D}} \beta_i(v_1, \ldots, v_v) \cdot X^{q^i} + \gamma(v_1, \ldots, v_v), \quad (5)$$

with $\alpha_{i,j} \in \mathbb{E}$, $\beta_i: \mathbb{F}^v \to \mathbb{E}$ being linear and $\gamma: \mathbb{F}^v \to \mathbb{E}$ being a quadratic function. Due to the special form of $\mathcal{F}$, the map $\overline{\mathcal{F}} = \Phi^{-1} \circ \mathcal{F} \circ \Phi$ is a quadratic polynomial map from $\mathbb{F}^{n+v}$ to $\mathbb{F}^n$. To hide the structure of $\overline{\mathcal{F}}$ in the public key, one combines it with two affine (or linear) maps $\mathcal{S}: \mathbb{F}^n \to \mathbb{F}^{n-a}$ and $\mathcal{T}: \mathbb{F}^{n+v} \to \mathbb{F}^{n+v}$ of maximal rank.

The public key of the scheme is the composed map $\mathcal{P} = \mathcal{S} \circ \overline{\mathcal{F}} \circ \mathcal{T}: \mathbb{F}^{n+v} \to \mathbb{F}^{n-a}$, the private keg consists of $\mathcal{S}$, $\mathcal{F}$ and $\mathcal{T}$.

Signature generation: To generate a signature for a message $h \in \mathbb{F}^{n-a}$, the signer performs the following three steps.

(1) Compute a preimage $x \in \mathbb{F}^n$ of h under the affine map $\mathcal{S}$.

(2) Lift x to the extension field $\mathbb{E}$ (using the isomorphism $\Phi$). Denote the result by X. Choose random values for the Vinegar variables $v_1, \ldots, v_v \in \mathbb{F}$ and compute $\mathcal{F}_V = \mathcal{F}(v_1, \ldots, v_v)$ Solve the univariate polynomial equation $\mathcal{F}_V(Y)=X$ by Berlekamp's algorithm and compute $y' = \Phi^{-1}(Y) \in \mathbb{F}^n$.

Set $y=(y'\|v^1\|\|v_v)$.

(3) Compute the signature $z \in \mathbb{F}^{n+v}$ by $z = \mathcal{T}^{-1}(y)$.

Signature verification: To check the authenticity of a signature $z \in \mathbb{F}^{n+v}$, one simply computes $h' = \mathcal{P}(z) \in \mathbb{F}^{n-a}$. If $h'=h$ holds, the signature is accepted, otherwise rejected.

QUARTZ is a multivariate signature scheme designed by Patarin and Courtois in [24]. It is an HFEv-based signature scheme with a specially designed signature generation process to enable secure short signatures of length 128 bit.

Patarin and Courtois suggested the following parameters for QUARTZ:

$(\mathbb{F}, n, D, a, v) = (GF(2), 103, 129, 3, 4),$

Due to this choice, the public key $\mathcal{P}$ of QUARTZ is a quadratic map from $\mathbb{F}^{107}$ to $\mathbb{F}^{100}$. The public key size of QUARTZ is 71 kB, the private key size 3 kB.

To avoid birthday attacks, Patarin and Courtois developed a special procedure for the signature generation process of QUARTZ. Roughly spoken, one computes four HFEv-signatures (for the messages h, $\mathcal{H}$ (h‖0x00), $\mathcal{H}$ (h‖0x01) and $\mathcal{H}$ (h‖0x02)) and combines them to a single 128 bit signature of the message h. Analogously, during the signature verification process, one has to use the public key P four times.

Security: Despite of its rather complicated signature generation process, breaking the QUARTZ scheme is still equivalent to breaking the underlying HFEv-scheme. The most important attacks against this scheme are the MinRank attack and direct algebraic attacks.

The MinRank attack on HFE: We first describe the attack of Kipnis and Shamir [18] against the HFE cryptosystem. For the simplicity of our description we restrict ourselves to homogeneous maps $\mathcal{F}$ and $\mathcal{P}$.

The key observation of the attack is to lift the maps $\mathcal{S}$, $\mathcal{T}$ and $\mathcal{P}$ to functions $\mathcal{S}^*$, $\mathcal{T}^*$ and $\mathcal{P}^*$ over the extension field $\mathbb{E}$, Since $\mathcal{S}$ and $\mathcal{T}$ are linear maps, $\mathcal{S}^*$ and $\mathcal{T}^*$ have the form $$S^*(X) = \sum_{i=1}^{n-1} s_i \cdot X^{q^i} \text{ and } \mathcal{T}^*(X) = \sum_{i=1}^{n-1} t_i \cdot X^{q^i}, \quad (6)$$

with coefficients $s_i$ and $t_i \in \mathbb{E}$. The function $\mathcal{P}^*$ can be expressed as $$\mathcal{P}^*(X) = \sum_{i=0}^{n-1} \sum_{j=0}^{n-1} p_{ij}^* X^{q^i+q^j} = \underline{X} \cdot P^* \cdot \underline{X}^T, \quad (7)$$

where $\mathcal{P}^*=[p^*_{ij}]$ and $X=(X^{q^0}, X^{q^1}, \ldots, X^{q^{n-1}})$. Due to the relation $\mathcal{P}^*(X) = \mathcal{S}^* \circ \mathcal{F} \circ \mathcal{T}^*(X)$ we get $\mathcal{S}^{*-1} \circ \mathcal{P}^*(X) = \mathcal{F} \circ \mathcal{T}^*(X)$ and $$\tilde{P} = \sum_{k=0}^{n-1} s_k \cdot G^{*k} = W \cdot F \cdot W^T \quad (8)$$

with $g^{*k}_{ij} = (p^*_{i-k,j-k}) q^k$, $w_{ij} = s_{j-i}^{q^k}$ and F being the n×n matrix representing the central map Note that, due to the special structure of $\mathcal{F}$, the only non zero entries in the matrix F are located in the upper left r×r submatrix ($r = \lfloor \log_q D - 1 \rfloor + 1$). Since the rank of the matrix $W \cdot F \cdot W^T$ is less or equal to r, we can determine the coefficients $s_k$ of equation (8) by solving an instance of the MinRank problem.

In the setting of HFEv-, the rank of this matrix can, for odd characteristic, be bounded from above by [13]

$$\text{Rank}(\tilde{P}) \leq r + a + v. \quad (9)$$

Under the assumption that the vinegar maps $\beta_i$ look like random functions, we End that this bound is tight.

For fields of even characteristic we eventually have to decrease this rank by 1, since over those fields, the matrix $\tilde{P}$ is always of even rank. The complexity of the MinRank attack against HFEv-schemes is therefore given roughly by $$\text{Complexity}_{MinRank} = O(q^{n \cdot (r+v+a-1)} \cdot (n-a)^3), \quad (10)$$

For the HFE family of schemes, the direct attack, namely the attack by directly solving the public equation $\mathcal{P}(z) = h$ by an algorithm like XL or a Gröbrier basis method such as $F_4$ [14] is a major concern due to which happened to HFE challenge 1 [15]. At the time of the design of the QUARTZ scheme, very little was known theoretically about the complexity of algebraic attacks against the HFE family of systems, in particular, the HFEv-schemes. The authors of QUARTZ did not actually give an explanation for their selection of the parameters and therefore the parameter selection of their scheme was not supported by theoretical results. We need to point out that, as has been shown by experiments [21], the public systems of HFEv- can be solved significantly easier than random systems.

Recently, there has been a fundamental breakthrough in terms of understanding how algebraic attacks on the HFE family of systems work [9, 10, 13]. In particular, we now have a solid insight what happens in the case of HFEv-. An upper bound for the degeneration degree of a Gröbner Basis attack against HFEv- is given by [13]

$$d_{reg} \leq \begin{cases} \frac{(q-1) \cdot (r-1+a+v)}{2} + 2 & q \text{ even and } r+a \text{ odd,} \\ \frac{(q-1) \cdot (r+a+v)}{2} + 2 & \text{otherwise.} \end{cases} \quad (11)$$

where r is given by $r = \lfloor \log_q(D-1) \rfloor + 1$.

In [7] Courtois et al. estimated the complexity of a direct attack on QUARTZ by $2^{74}$ operations. However, they underestimated the degree of regularity of solving an HFEv-system drastically.

Efficiency: The most costly step during the signature generation process of QUARTZ is the inversion of the univariate polynomial equation $\mathcal{F}_V$ over the extension field $\mathbb{E}$. This step is usually performed by Berlekamp's algorithm, whose complexity can be estimated by [26]

$$O(D^3 + n \cdot D^2). \quad (12)$$

Due to the high degree of the HFE polynomial used in QUARTZ, the inversion of $\mathcal{F}$ is very costly. Furthermore, we have to perform this step four times during the signature generation of QUARTZ. Additionally, the design of QUARTZ requires the central equation $\mathcal{F}(Y) - X = 0$ to have a unique root. Since, after choosing random values for Minus equations and Vinegar variables, $\mathcal{F}$ can be seen as a random function, this requires about e trials to obtain a signature. Thus, the QUARTZ signature scheme is rather slow and it takes about 11 seconds to generate a signature [4].

The theoretical breakthrough mentioned above indicates that we can substantially improve the original design of QUARTZ without weakening the security of the scheme by reducing the degree D of the HFE polynomial in use, if we adapt the number of Minus equations and Vinegar variables in an appropriate way. By reducing the degree of the central HFE polynomial we can speed up the operations of Berlekamp's algorithm and therefore the signature generation process of the HFEv-scheme.

We now present the new HFEv-design. The key question we need to answer is the following: How should we choose the degree D of the central HFE polynomial? A small D will speed up the scheme, but choosing D too small might bring the security of the scheme into jeopardy.

With experiments and theoretical considerations, we determine that we should use $D \leq 33$. We determine that we should not use D=2 ("Square" systems) or 3, since such small values of D would lead to maps $\mathcal{F}$ of rank 2. In order to find a balance between security and efficiency, we choose D to be 9 or 17.

Since increasing a and v does not have a significant impact on the efficiency of the scheme, we determine that we should adjust a and v according to the security requirement and we propose that a+v should be at least 8.

Based on our experiments, to achieve a security level of 80 bits, we propose two different versions of our HFEv-based signature scheme over the field GF(2):

Gui-95 with (n,D,a,v)=(95,9,5,5) with 90 equations in 100 variables and

Gui-94 with (n,D,a,v)=(94,17,4,4) with 90 equations in 98 variables

For a higher level of security, we propose Gui-127, with the parameters (n, D, a, v) (127, 9, 4, 6), providing a design security level of 120 bits.

As in the case of QUARTZ, we have to repeat the inversion of the HFEv-core map several times to avoid birthday attacks against Gui. One has to sign different hash values of the same message and combine the outputs into a single signature. Here, we follow the design of QUARTZ and apply the core HFEv-operation multiple times (4, 3 and 4 times respectively) for Gui-94, -95 and -127.

These new Gui designs are much faster (hundreds of times) than the original QUARTZ scheme.

One can also use a different $q \neq 2$. In this case, we determine that the degree of the HFE polynomial shall be $\leq q^5 + 1$.

1.2 the New White-Box Encryption Using Multivariate Digital Signatures

We will now describe a new invention to perform whitebox encryption when we have a practical multivariate public key signature scheme like what we described above.

Cryptography is used to protect a communication channel. Normally in the design of cryptosystems, the end points are assumed to be secure and the attacker only has access to the input/output of the algorithm. In this case, the algorithm needs to be executed in a secure setting. However, for practical applications, the main problem are situations in which such a black-box security model does not apply any more. There have been a lot of new cryptanalysis techniques that incorporate additional side-channel information such as execution timing, electromagnetic radiation and power consumption to break the system. Currently, there has been proposed a more practical attack model [6], where cryptography is used on open devices anyone can access. This is called a white-box attack model, where an attacker has full access to the software implementation of a cryptographic algorithm and has full control over the execution platform. The key challenge here is to implement the cryptographic algorithm in software in such a way that cryptographic assets remain secure under white-box attacks. Such implementations play a key role in protecting digital assets, for example hi Digital Rights Management (DRM) applications.

The notion of white-box cryptography (WBC) has been introduced in [6]. The initial motivation was to embed symmetric secret keys into the implementation of popular standards like ABS or DES in a way that binds the attacker to the specific implementation for DRM purposes. The main idea of this is to obfuscate key-dependent parts of the cipher and publish them as lookup tables. However, most of these constructions are not secure.

To formalize the problem, two notions have been suggested for white-box encryption schemes. The goal of a weak white-box implementation of a cryptographic primitive is to prevent key-recovery attacks. This ensures that unauthorized users can not obtain any compact representation of the key which can be used to decrypt the protected content. The strong white-box implementation of a primitive prevents plaintext-recovery attacks.

In [2], Biryukov et al. proposed to use multivariate encryption schemes to construct white-box encryption schemes that not only hide the key for the weak white-box implementation, but also provide non-invertibility aiming for the strong white-box construction. However, their schemes have been broken.

We propose here to use multivariate signature schemes to build a white box encryption scheme. Our technique is applicable to all existing multivariate signature schemes including HFEv-[24] and the improvements above. Here, we will use the example of Rainbow [12] to explain how our technique works.

The Rainbow signature scheme [12] is one of the most promising and best studied multivariate signature schemes. The scheme is defined as follows: Let Let $\mathbb{F}$ be a finite field, $n \in \mathbb{N}$ and $v_1 < v_2 < \ldots < v_l < v_{l+1} = n$ be a sequence of integers. We set $o_i = v_{i+1} - v_i$, $O_i = \{v_i+1, \ldots, v_{i+1}\}$ and $V_i = \{1, \ldots, v_i\}$ (i=1, \ldots, l). The number of elements in $O_i$ is given by $o_i$ and we have $|V_i| = v_i$ (i=1, \ldots, l).

Key Generation: The private key consists of two invertible affine maps $\mathcal{S}: \mathbb{F}^m \to \mathbb{F}^m$ and $\mathcal{T}: \mathbb{F}^n \to \mathbb{F}^n$ and a quadratic map $\mathcal{F}(x) = (f^{(v_1+1)}(x), \ldots, f^{(n)}(x)): \mathbb{F}^n \to \mathbb{F}^m$. Here, $m = n - v_1$ is the number of components of $\mathcal{F}$.

The components of the central map $\mathcal{F}$ are of the form $$f^{(i)} = \sum_{k,l \in V_j} \alpha_{k,l}^{(i)} \cdot x_k \cdot x_l + \sum_{k \in V_j, l \in O_j} \beta_{k,l}^{(i)} \cdot x_k \cdot x_l + \sum_{k \in V_j \cup O_j} \gamma_k^{(i)} \cdot x_k + \eta^{(i)},$$

where j is the only integer such that $i \in O_j$.
The public key is the composed map $\mathcal{P}(x) = \mathcal{S} \circ \mathcal{F} \circ \mathcal{T}(x): \mathbb{F}^n \to \mathbb{F}^m$.

Signature Generation: To generate a signature for a document $h \in \mathbb{F}^m$, we compute recursively $x = \mathcal{S}^{-1}(h)$, $y = \mathcal{F}^{-1}(x)$ and $z = \mathcal{T}^{-1}(y)$. Here, $\mathcal{F}^{-1}(x)$ means finding one (of approximately $q^{v_1}$) pre-image of x under the central map $\mathcal{F}$. In the case of Rainbow, this is done as follows.

| Algorithm 1 Inversion of the Rainbow central map |
| --- |
| 1: Choose random values for the variables $y_1, \ldots, y_{v_1}$ and substitute them into the polynomials $f^{(i)}$ (i = $v_1$ + 1,...n). |
| 2: for k = 1 to l do |
| 3:     Perform Gaussian Elimination on the polynomials $f^{(i)}$ (i $\in O_k$) to get values for the variables $y_i$ (i $\in O_k$). |
| 4:     Substitute the values of $y_i$ (i $\in O_k$) into the polynomials $f^{(i)}$ (i $\in v_{k+1}$ + 1,...n). |
| 5: end for |

It might happen that one of the linear systems in step 3 of the algorithm does not have a, solution. In this case one has to choose other values for $y_1, \ldots, y_{v_1}$ and start again. The signature of the document h is $z \in \mathbb{F}^n$.

Signature Verification: To cheek the authenticity of a signature $z \in \mathbb{F}^n$, one simply computes h'=P(z). If h'=h holds, the signature is accepted, otherwise rejected.

In the following, we will use Rainbow to demonstrate how to build a white-box encryption scheme using a multivariate signature scheme. However, our construction can be applied to any multivariate signature scheme including QUARTZ and Gui.

In a practical scenario, a sender (e.g. TV company) broadcasts its program in the form of encrypted messages to a set $\mathcal{R}$ of receivers. The TV company is able to both en- and decrypt messages, whereas the receivers can only decrypt the sent messages. Unlegitimate users should not be able to decrypt the program, even with the help of a receiver $r \in \mathcal{R}$. Therefore, the receivers are not directly in the possession of the decryption key; instead of this, the key is embedded in a concrete implementation or a hardware device. To prevent the user from extracting the key out of the device, the key dependent parts of the cipher are hidden in a series of look-up tables. The main security requirements of our scenario are No key extraction: Tt should be infeasible for the receivers to extract the public key from the device.

One-wayness: A receiver can use his device only to decrypt messages from the sender; he can not encrypt his own mages.

Traceability: When a receiver $r \in \mathcal{R}$ gives his device to an unlegitimate user, the identity of the receiver r can be revealed.

The security requirements "No key extraction" and "One-wayness" correspond closely to the notions of weak and strong white-box implementations of symmetric ciphers. However, instead, of using a symmetric cipher such as AES or DES, we here look at public key, in particular multivariate schemes.

Our technique to transform a multivariate signature scheme into a white-box encryption scheme can be described as follows.

The sender (e.g. a TV-company) wants to broadcast a program to its receivers. Let P the public key of a multivariate signature scheme such as Rainbow and $(\mathcal{S}, \mathcal{F}, \mathcal{T})$ be the corresponding private key. The sender is in possession of both the public and private key, whereas the receivers only have the public key (embedded in an hardware device).

Encryption: rib encrypt a message $h \in \mathbb{F}^m$, the TV company computes recursively $x = \mathcal{S}^{-1}(h)$, $y = \mathcal{F}^{-1}(x)$ and $z = \mathcal{T}^{-1}(y)$. Here, $\mathcal{F}^{-1}(x)$ means finding one (of possibly many) pre-image of x under the central map $\mathcal{F}$. In the case of Rainbow this is done as shown in Algorithm 1. The ciphertext of the message h is $z \in \mathbb{F}^n$.

White-Box Decryption: To decrypt the ciphertext $z \in \mathbb{F}^n$, the hardware device simply evaluates the public key $\mathcal{P}$ at z. As shown below (item 73 ff.), this can be easily done via look-up tables.

The encryption process as described above consists of computing a signature $z \in \mathbb{F}^n$ for the message $h \in \mathbb{F}^m$ The white-box decryption corresponds widely to the verification process of the signature scheme (see FIG. 2).

In the setting of digital rights management, let us consider the example of a company selling e-books online. For each user, the company produces a specific key $\mathcal{P}_U$. This $\mathcal{P}_U$ needs to be securely given to the user U and U is not allowed to give it to anyone else. If U hands his key to other users, the company can prove this, since $\mathcal{P}_U$ is a key uniquely belonging to U. The company can produce a software computing $\mathcal{P}_U$ or it can also use hardware technology to bind U to a hardware from which it is very costly to derive $\mathcal{P}_U$, or we can bind $\mathcal{P}_U$ to a specific hardware device, such that only designated devices can perform decryption using $\mathcal{P}_U$.

When the company needs to send a book to the user U, it proceeds as follows. For each block $h \in \mathbb{F}^m$ of the book file it uses, similar to the case of signature generation, the secret key attached to $\mathcal{P}_U$ to compute an encrypted version $z \in \mathbb{F}^n$ of the block. The encrypted blocks are collected in a new file, which is then sent to the user U.

The user can use his key $\mathcal{P}_U$ to decrypt each block in the encrypted file and then put the single blocks together in order to recover the original book file.

In this setting, we produce a white-box encryption.

In addition, due to the fact that we have a message expansion (for signature schemes we have n>m), we can use the extra information space to put more information inside which can be used it for further purposes.

Due to the high efficiency of Rainbow, our system is much more efficient than those described in [2].

We can also combine the decryption and reading function together in the hardware such that it is extremely costly to extract the pubic key from the hardware. This will serve well for the purpose of digital rights managements.

We can also increase the key size of Rainbow by using smaller fields in order to make the system more secure in terms of public key extraction. This can be done in two different ways.

1) direct use of smaller fields and adjusting the parameters to a larger key size.

2) splitting the base field into smaller fields and adding random linear transformations $\mathcal{S}$, $\mathcal{T}$ over the smaller field.

In the implementation of decryption process of our white-box scheme, we propose a new idea of modified tables.

The basic idea is as follows.

Addition and multiplication over the finite field F are essentially maps $$F \times F \to F,$$

which can be implemented as look-up tables.

In the case of multiplication, we have $$x_i \times x_j (ax_i) \times a^{(-1)} x_j$$

and $$a_{ij} x_i \times x_j = (a_{ij} ax_i) \times a^{(-1)} x_j.$$

In the case of addition, we have $$x_i + x_j = (a + x_i) + (-a + x_j)$$

and $$b + x_i + x_j = (b + a + x_i) + (b - a + x_j)$$

Therefore, we have a large number of possibilities to modify the above look-up tables.

In addition, we can use different irreducible polynomials to define the same finite fields or use field isomorphisms to modify the tables. By doing so, we obtain a large variety of possible table implementations.

Even more generally, we can similarly use any randomly selected permutation map to modify the tables.

We can use the modified tables to implement the whole decryption process using the public key map. This gives us an implementation to make the reverse engineering very costly.

We can also compose two signature schemes together using composition of maps to build a degree 4 white-box encryption scheme. By using a small amount of internal perturbation, there is an efficient way to block the decomposition of such a map.

The One-wayness of our implementation is guaranteed by the use of a public key signature scheme. To encrypt messages, a user has to know the private key of the signature scheme, which is only known by the sender. Therefore, the One-wayness of our scheme is guaranteed as long as the underlying signature scheme is secure.

REFERENCES

[1] D. J. Bernstein, J. Buchmann, E. Dabmen (eds.): Poet Quantum Cryptography. Springer, 2009.
[2] A. Biryukov, C. Bouillaguet, D. Khovratovich: Cryptographic Schemes Based on the MASA Structure: Black-Box, White-Box, and Public-Key (Extended Abstract). ASIACRYPT (1) 2014: 63-84
[3] A. Bogdanov, T. Eisenbarth, A. Rupp, C. Wolf. Time-area optimized public-key engines: MQ-cryptosystems as replacement for elliptic curves? CUES 2008, LNCS vol. 5154, pp. 45-61. Springer, 2008.
[4] A. I. T. Chen, M.-S. Chen, T.-R. Chen, C.-M. Cheng, J. Ding, E. L.-H. Kuo, F. Y.-S. Lee, B.-Y. Yang. SSE implementation of multivariate PKCs on modern x86 cpus. CBES 2009, LNCS vol. 5747, pp. 33-48. Springer, 2009.
[5] S. Chow, P. Eisen, H. Johnson, P. C. van Oorschot, A white-box DES Implementation for DRM applications. Digital Rights Management Workshop, LNCS vol. 2606, pages 1-15. Springer, 2002.
[6] S. Chow, P. Eisen, H. Johnson, P. C. van Oorschot: White-Box Cryptography and an ABS Implementation, SAC 2002, LNCS vol. 2595, pp. 250-270. Springer 2003.
[7] N. T. Courtois, M. Daum, P. Polka: On the Security of HFE, HFEv- and QUARTZ. PKO 2003, LNCS vol. 2567, pp. 337-350. Springer 2003.
[8] J. Ding, J. E. Gower, D. S. Schmidt: Multivariate Public Key Cryptosystems. Springer, 2006.
[9] J. Ding, T. Hodges: Inverting HFE Systems Is Quasi-Polynomial for All Fields. CRYPTO 2011, LNCS vol. 6841, pp. 724-742. Springer 2011.
[10] J. Ding, T. Kleinjung: Degree of regularity for HFE-. IACR eprint 2011/570.
[11] J. Ding, A. Petzoldt, Wang: The Cubic Simple Matrix Encryption Scheme, PQCrypto 2014, LNCS vol. 8772, pp. 76-87. Springer, 2014.
[12] J. Ding, D. S. Schmidt: Rainbow, a new multivariate polynomial signature scheme. ACM 2005, LNCS vol. 3531, pp. 164-175. Springer, 2005.

[13] J. Ding, B. Y. Yang: Degree of Regularity for HFEv and HFEv-. PQCrypto 2013, LNCS vol. 7932, pp. 52-66. Springer, 2013.

[14] J. C. Faugére: A new efficient algorithm for computing Groebner bases (F4). Journal of Pure and Applied Algebra 139, pp. 61-88 (1999).

[15] J. C. Faugére, A. Joux: Algebraic Cryptanalysis of Hidden Field Equation (HFE) Cryptosystems Using Groebner Bases. CRYPTO 2003, LNCS vol. 2729, pp. 44-60. Springer, 2003.

[16] M. R. Gamy and D. S. Johnson: Computers and Intractability: A Guide to the Theory of NP-Completeness. W.H. Freeman and Company, 1979.

[17] A. Kipnis, L. Patarin, L. Goubin: Unbalanced Oil and Vinegar Schemes. EUROCRYPT 1999. LNCS vol. 1592, pp. 206-222 Springer, 1999.

[18] A. Kipnis, A. Shamir: Cryptanalysis of the HFE Public Key Cryptosystem. CRYPTO 99, LNCS vol. 1666, pp. 19-30. Springer, 1999.

[19] D. Kravitz: Digital Signature Algorithm. U.S. Pat. No. 5,231,668 (July 1991).

[20] T. Matsumoto, H. Iwai: Public quadratic polynomial-tuples for efficient signature-verification and message-encryption. EUROCRYPT 1988, LNCS vol. 330, pp. 419-453. Springer, 1088.

[21] M. S. E. Mohamed, J. Ding and J. Buchmann; Towards Algebraic Cryptanalysis of HFE Challenge 2, ISA 2011, Communications in Computer and Information Science vol. 200, pp. 123-131. Springer, 2011.

[22] J. Patarin; Cryptographic communication process. U.S. Pat. No. 6,790,675 (July 1996).

[23] J. Patarin: Cryptanalysis of the Matsumoto and Imai public key scheme of Eurocrypt 88. CRYPTO 95, LNCS vol. 963, pp. 248-261. Springer, 1995.

[24] J. Patarin, N. Courtois, L. Goubin; QUARTZ, 128-Bit Long Digital Signatures. CTRSA 2001, LNCS vol. 2020, pp, 282-297. Springer, 2001.

[25] J. Patarin, N. Courtois, L. Goubin: Flash, a fest multivariate signature algorithm. CTRSA 2001, LNCS vol. 2020, pp. 298-307. Springer, 2001,

[26] C. Richards: Algorithms for Factoring Square-Free Polynomials over Finite Fields. Master Thesis. Simon Fraser University (Canada), 2009.

[27] R. L. Rivest, A, Shamir, L. Adlerian: A Method for Obtaining Digital Signatures and Public-Key Cryptosystems. Commun. ACM 21 (2), pp. 120-126 (1978).

[28] P. Short Polynomial-Time Algorithms for Prime Factorization rod Discrete Logarithms on a Quantum Computer, SIAM J. Comput. (5), pp. 1484-1509.

[29] C. Ta A. Diene, S. Tang, J. Ding: Simple Matrix Scheme for Encryption. PQCrypto 2013, LNCS vol. 7932, pp. 231-242, Springer, 2013.

The invention claimed is:

1. A computer-implemented method for establishing an improved digital signature scheme, comprising:

generating a public and a private key in the following steps:

(1) selecting a finite field $\mathbb{F} = \mathbb{F}_q$ with q elements and a degree n extension field $\mathbb{E}$ of $\mathbb{F}$, selecting integers D, a and v such that ($\mathbb{F}$, n, D, a, v)=(GF(2), n, D, a, v), D≤33 and a+v≥8, defining a canonical isomorphism, $\Phi$, between $\mathbb{F}^n$ and $\mathbb{E}$, such that $$\Phi(x_1, \ldots, x_n) = \sum_{i=1}^{n} x_i \cdot X^{i-1}$$

(2) selecting a central map $\mathcal{F}$ as a map from $\mathbb{E} \times \mathbb{F}^v$ to $\mathbb{E}$ of the form $$\mathcal{F}(X) = \sum_{i,j=0}^{q^i+q^j \leq D} \alpha_{i,j} \cdot X^{q^i+q^j} + \sum_{i=1}^{q^i \leq D} \beta_i(v_1, \ldots, v_v) \cdot X^{q^i} + \gamma(v_1, \ldots, v_v),$$

wherein $\alpha_{i,j} \in \mathbb{E}$, $\beta_i: \mathbb{F}^v \to \mathbb{E}$ being linear and $\gamma: \mathbb{F}^v \to \mathbb{E}$ area quadratic function, and coefficients $\alpha_{ij}$ as well as the coefficients of the maps $\beta_i$ and $\gamma$ are randomly selected elements of $\mathbb{E}$, (2) generating the public key as composed map $\mathcal{P} = S \circ \mathcal{F} \circ \mathcal{T}: \mathbb{F}^{n+v} \to \mathbb{F}^{n-a}$, wherein $\mathcal{F} = \Phi^{-1} \circ \mathcal{F} \circ \Phi$ and S: $\mathbb{F}^n \to \mathbb{F}^{n-a}$ and $\mathcal{T}: \mathbb{F}^{n+v} \to \mathbb{F}^{n+v}$ are randomly selected affine linear maps of maximal rank, wherein the public key is a set of quadratic polynomials, and generating the private key comprising S, $\mathcal{F}$ and $\mathcal{T}$, determining a signature for a message $h \in \mathbb{F}^{n-a}$ comprising:

(1) computing a pre-image $x \in \mathbb{F}^n$ of h under the affine map S, (2) lifting x to the extension field $\mathbb{E}$ using the isomorphism $\Phi$ and denoting the result by X choosing random values for Vinegar variables $v_1, \ldots, v_v \in \mathbb{F}$ and computing $\mathcal{F}_v = \mathcal{F}(v_1, \ldots, v_v)$ solving the univariate polynomial equation $\mathcal{F}_v(Y) = X$ by Berlekamp's algorithm and computing $y' = \Phi^{-1}(Y) \in \mathbb{F}^n$, and setting $y = (y' \| v_1 \| \ldots \| v_v)$, and (3) computing the signature $z \in \mathbb{F}^{n+v}$ by $z = \mathcal{T}^{-1}(y)$, wherein an authenticity of a signature $z \in \mathbb{F}^{n+v}$ can be verified by computing $h' = \mathcal{P}(z) \in \mathbb{F}^{n-v}$ and determining $h' = h$.

2. The method for establishing an improved digital signature scheme, according to claim 1, wherein q is prime, $D \leq q^5 + 1$ and $a + v \geq 8$.

3. The method for establishing an improved digital signature scheme, according to claim 1, wherein a length of the signature less than 128 bits, the message h and a-hash of padded values of h multiple (≤3) times and combines a plurality of single signatures to a single long signature of the message h, and during a signature verification, the public key $\mathcal{P}$ is used.

4. A computer-implemented method to build a white-box encryption scheme using a multivariate signature scheme, comprising:

defining a multivariate signature scheme as follows:

(1) establishing an invertible quadratic map $\mathcal{F}: \mathbb{F}^n \to \mathbb{F}^n$, wherein $\mathcal{F}$ has two randomly selected invertible affine maps $\mathcal{P}: \mathbb{F}^m \to \mathbb{F}^m$ and $\mathcal{T}: \mathbb{F}^n \to \mathbb{F}^n$, and defining a public key as composed map $\mathcal{P} = S \circ \mathcal{F} \circ \mathcal{T}$ and a private key comprising S, $\mathcal{F}$ and $\mathcal{T}$ such that the public key is invertible and $n \geq m$ (2) generating a signature to sign a message $h \in \mathbb{F}^m$, comprising recursively computing $x = S^{-1}(h) \in \mathbb{F}^n$, $y = \mathcal{F}^{-1}(x) \in \mathbb{F}^n$ and $z = \mathcal{T}^{-1}(y)$, wherein $\mathcal{F}^{-1}(x)$ is a pre-image of x under the central map $\mathcal{F}$, and the signature of the message h is $z \in \mathbb{F}^n$, and wherein an authenticity of signature $z \in \mathbb{F}^n$ can be verified by computing $h' = \mathcal{P}(z) \in \mathbb{F}^n$ and determining $h' = h$ implementing the evaluation of the selected public key $\mathcal{P}$ in a hardware device in such a way that it is difficult and costly to extract the public key from the hardware device;

encrypting a message $h \in \mathbb{F}^m$, by performing the signature generation algorithm of the multivariate signature scheme to compute a ciphertext $z \in \mathbb{F}^n$ of the message h; and decrypting ciphertext $z \in \mathbb{F}^n$ by evaluating the public key $\mathcal{P}$ at z.

5. The method according to claim 4, wherein an evaluation of the public key $\mathcal{P}$ is performed in a hardware device by multiplication and addition of $\mathbb{F}$-elements using different lookup tables.

6. The method according to claim 5, further comprising modification using the following algebraic methods:

Addition and multiplication over a finite field F to establish a map $$F \times F \to F,$$

which can be implemented as a look-up table, which can be modified as follows, in the case of multiplication:

$$x_i \times x_j = (ax_i) \times a^{(-1)} x_j$$

and $$a_{ij} x_i \times x_j = (a_{ij} a x_i) \times a^{(-1)} x_j, \text{ and}$$

in the case of addition:

$$x_i + x_j = (a + x_i) + (-a + x_j)$$

and $$b + x_i + x_j = (b + a + x_i) + (b - a + x_j),$$

wherein a is randomly selected in order to modify the tables.

7. The method according to claim 5, further comprising using different irreducible polynomials for at least one of defining the same finite fields in different ways and using field isomorphisms to modify the lookup tables.

8. The method according to claim 5, further comprising using any randomly selected permutation map over the small field to modify the lookup tables.

9. The method according to claim 4, further comprising securely transmitting a specific key, $\mathcal{P}_U$, to receiver U, wherein $\mathcal{P}_U$ is uniquely associated with U, and U is not allowed to give the specific key, $\mathcal{P}_U$, to anyone else.

10. The method according to claim 4, further comprising producing a software to compute $\mathcal{P}_U$, wherein $\mathcal{P}_U$ is costly to derive $\mathcal{P}_U$ and only designated hardware devices can perform decryption using $\mathcal{P}_U$.

11. The method according to claim 4, further comprising using extra information space-provided by the fact that n≥m, to be used for at least one of tracing one or more receivers, detecting illegitimate copies, and counting a number of decryptions.

12. The method according to claim 4, further comprising combining a decryption and a function comprising at least one of reading, playing a movie, and any application of data, for usage in the hardware device, wherein intercepting decrypted data and retrieving a pubic key from hardware device is costly.

13. The method according to claim 4, further comprising increasing a key size of the signature scheme by using smaller fields to increase security of a public key extraction in at least one of the following ways:

1) use of the smaller fields and adjusting parameters to a larger key size,
2) splitting up a base field into smaller fields and using additional random linear transformations S, T on the smaller fields, and
3) increasing parameters including field size and extension field size.

14. The method according to claim 4, further comprising composing two signature schemes together using at least one of composition of maps to build a degree 4 white-box encryption and using internal perturbation in to block a decomposition of such a map.

15. The method according to claim 4, where the user directly uses a degree of 3 or more signature schemes for white-box encryption.

* * * * *